United States Patent [19]

Geringer et al.

[11] Patent Number: 4,691,590
[45] Date of Patent: Sep. 8, 1987

[54] CONNECTING ROD DESIGN WITH VOIDS

[75] Inventors: Miles S. Geringer, Milwaukee; Vernon R. Kaufman, Cedarburg, both of Wis.

[73] Assignee: Tecumseh Products Company, Tecumseh, Mich.

[21] Appl. No.: 816,208

[22] Filed: Jan. 6, 1986

[51] Int. Cl.[4] .............................................. G05G 1/00
[52] U.S. Cl. ...................................... 74/579 E; 74/581
[58] Field of Search ................ 74/579 R, 579 E, 581, 74/587; 384/288, 294, 295, 267, 273; 29/156.5 A, 149.5, 525; 123/197 AB, 197 AC

[56] References Cited

U.S. PATENT DOCUMENTS

| | | | |
|---|---|---|---|
| 683,553 | 10/1901 | Carter | 74/579 X |
| 1,427,788 | 9/1922 | Drevitson | 74/581 |
| 1,895,467 | 2/1932 | Wintzer | 74/579 |
| 1,995,835 | 3/1935 | Buckwalter | 74/579 |
| 2,084,188 | 6/1937 | Buchanan | 74/581 X |
| 2,716,578 | 8/1955 | Hurley | 308/23 |
| 2,733,782 | 2/1956 | Bachman | 188/207 |
| 2,890,598 | 6/1959 | Bensinger et al. | 74/579 |
| 2,995,953 | 8/1961 | DeFazi | 74/579 E |
| 3,149,503 | 9/1964 | Kleindienst | 74/579 |
| 3,285,098 | 11/1966 | Beveridge | 74/579 |
| 3,338,113 | 8/1967 | Camp | 74/579 |
| 3,559,503 | 2/1971 | Elsbett | 74/579 E |
| 3,739,657 | 6/1973 | Patchen et al. | 74/587 |
| 4,191,238 | 3/1980 | Pichl | 29/156.5 A |
| 4,425,820 | 1/1984 | Swozil | 74/579 R |
| 4,494,286 | 1/1985 | Kaufman | 29/156.5 A |
| 4,549,445 | 10/1985 | Kaufman | 74/579 R |

FOREIGN PATENT DOCUMENTS

| | | | |
|---|---|---|---|
| 412596 | 10/1922 | Fed. Rep. of Germany | 74/579 |
| 1210263 | 2/1966 | Fed. Rep. of Germany | 74/579 R |
| 2807298 | 8/1979 | Fed. Rep. of Germany | 74/579 E |
| 854061 | 4/1940 | France | 74/579 |
| 57-165146 | 10/1982 | Japan | 29/156.5 A |
| 724067 | 2/1955 | United Kingdom | |
| 898268 | 6/1962 | United Kingdom | 29/156.5 A |

OTHER PUBLICATIONS

*Machine Design*, by Boyer and Kuivinen, "Calculating Stresses in Engine Parts", pp. 53–55, Aug. 1940.

*Primary Examiner*—Gary L. Smith
*Assistant Examiner*—Rodney M. Lindsey
*Attorney, Agent, or Firm*—Jeffers, Hoffman & Niewyk

[57] ABSTRACT

A connecting rod for reciprocating piston machines having piston pin and crankshaft ring portions with bores therein connected together by a load bearing member. The load bearing member has voids within it adjoining the outer perimeters of the piston pin and crankshaft ring portions. When press-fitting a liner or cup bearing within the ring portion bores, the voids allow the piston pin and crankshaft ring portions to expand radially uniformly at the connection between the ring portions and the load bearing member such that the liner and bearing retain a substantially circular shape.

20 Claims, 10 Drawing Figures

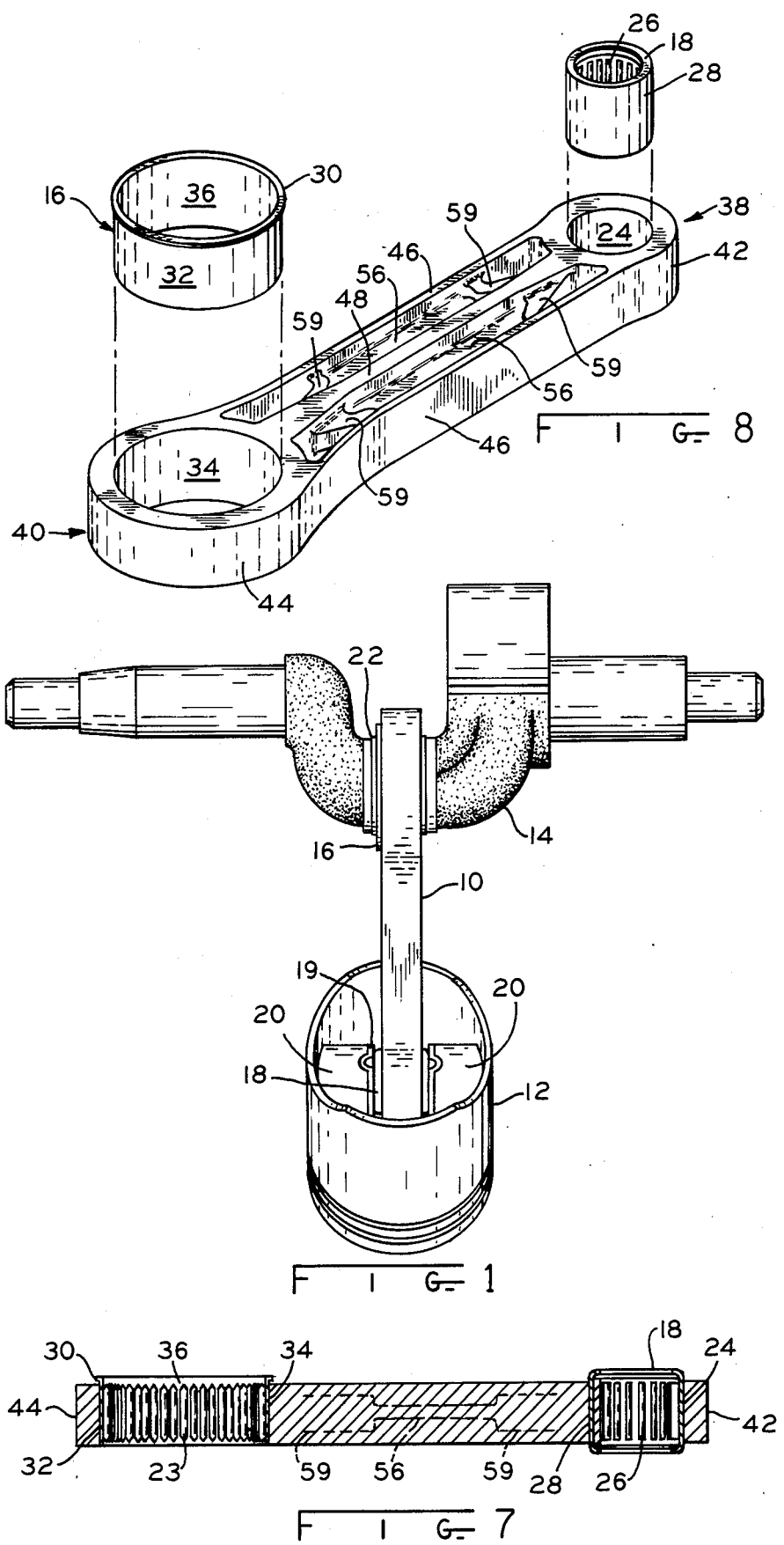

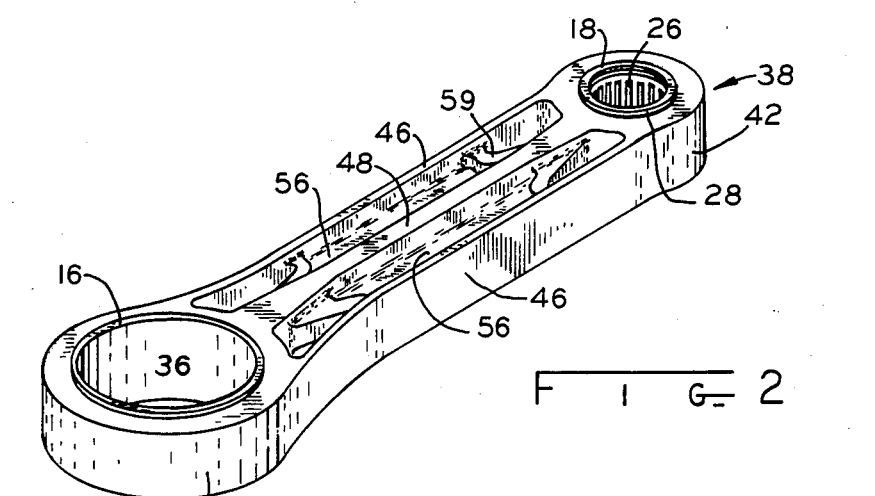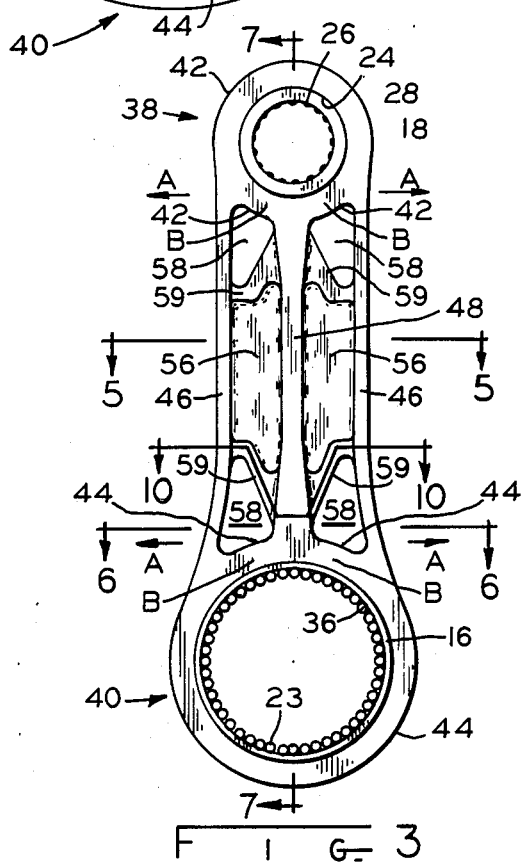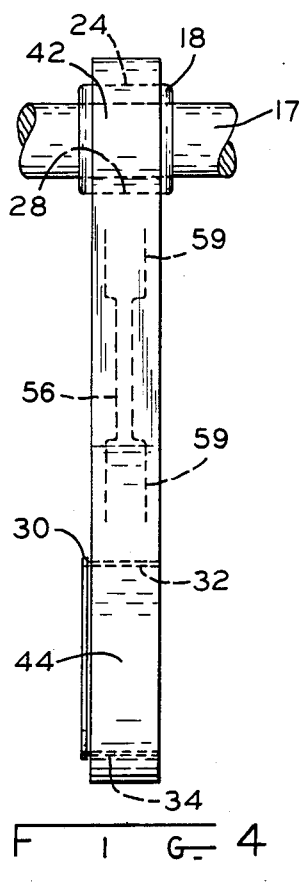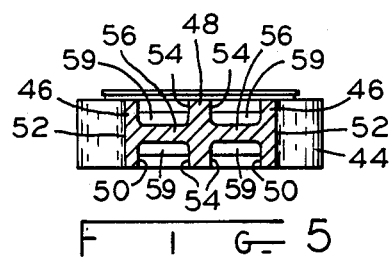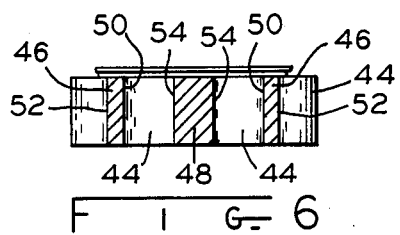

CONNECTING ROD DESIGN WITH VOIDS

BACKGROUND OF THE INVENTION

This invention relates generally to a connecting rod used for connecting together reciprocating and rotating members in reciprocating piston machines such as combustion engines and compressors. More specifically, the invention is directed to a connecting rod design which is adapted to have press-fitted within its piston pin MS6 and crankshaft bores either bearings or liners. The design allows the piston pin MS6 and crankshaft portions which form the bores of the connecting rod, to deform radially substantially uniformly during the press-fitting operation such that the liner or bearing press-fitted within the respective bores retain a substantially circular shape. This is due to the creation of equal radial resistive forces upon the liner or bearing.

Connecting rods are designed with a piston pin ring portion and a crankshaft ring portion connected together by a connecting member which is connected to the outer periphery of each ring portion. The piston pin ring portion has a bore for receiving a bearing for rotatably receiving a piston pin, and the crankshaft ring portion has a bore for receiving a liner for rotationally receiving the crankshaft. Each ring portion is thus always reinforced and made stronger at the connecting area by the connecting member.

In the past, when a liner or bearing was press-fitted within a respective bore of the ring portions, the forces created by the tight fit caused non-uniform radial deformation of the respective ring portions. This was caused by the reinforcement of the ring portions by the connecting member at the respective connecting areas of the ring portions. Stated differently, the ring portions were not allowed to deform uniformly upon the press-fitting because the connecting member resisted deformation of the ring portion at the connecting area. Since deformation generally occurred in the direction of least resistance, press-fitting a liner or a bearing within a ring portion bore caused the ring portions to take a generally non-circular shape. This was caused by the ring portion deforming radially more in the area of the ring portion which was not connected to the connecting member. Because of this non-uniform deformation, clearances between the crankshaft or piston pin and the bearings could not be held as close as desired. Accordingly, the life of the bearings and thus the combustion engine or compressor was considerably shortened. Further, the forces transferred between the connecting rod, piston, and the crankshaft were not transferred uniformly upon the full contacting surfaces and hence the life of the liners, bearings, connecting rod, piston rod and crankshaft were substantially limited.

The inside diameter of liners or cups after the press-fitting operation can be machined into a more uniform circular shape. However, this does not solve the problem because the non-uniform radial forces of the ring portions create uneven radial distortion at elevated temperatures. Further, machining each liner or bearing bore requires another step in the manufacturing process which is considerably time consuming and costly. Therefore, the method of machining the inside diameter of the liners or cups after press-fitting is not satisfactory.

SUMMARY OF THE INVENTION

It is the principal object of the invention to overcome the above-discussed disadvantages associated with earlier connecting rods. It is also the object of this invention to provide an economical connecting rod construction which has a uniform circular bore after the press-fitting of a liner or cup bearing for receiving a piston pin and a crankshaft. By providing a more circular bore after the press-fitting step than was possible with prior art connecting rods, tighter clearances may be attained between the crankshaft or piston pin and the liner or bearing. Thus, the life of the reciprocating and rotating members will be increased because the tighter clearances decrease wear. The tighter clearances also increase the contacting surface area between respective parts such that forces transferred between the parts are more evenly distributed. Further, the tighter clearances substantially reduce mechanical noise.

The objects of the invention are obtained by providing voids adjoining the outer periphery of the piston pin and crankshaft ring portions. These voids allow the ring portions, when press-fitting a liner or bearing within them, to deform substantially radially uniformly such that the liner or bearing retains a substantially circular shape. In essence, the voids break up the reinforcement of the ring portions caused by the connecting member without decreasing the connecting rod strength. The voids allow the ring porions to expand at the connection substantially in the same manner as the rest of the ring portion thereby resulting in a more uniform circular structure for receiving a respective crankshaft or piston pin. By providing a more uniform circular shape, tighter clearances can be provided and forces are more uniformly distributed such that the life of all the working parts are substantially increased with no added production cost.

The invention, in one form thereof, provides a connecting rod for use in internal combustion engines. The rod has a piston pin ring portion and a crankshaft ring portion which are connected together by a load bearing member. Each ring portion has a bore therein. A plurality of voids are provided in the load bearing member adjoining the outer perimeter of the crankshaft ring portion.

The invention, in one form thereof, provides a connecting rod for use in an internal combustion engine and having a piston pin ring portion with a piston pin bore therein and a crankshaft ring portion with a crankshaft bore therein. The ring portions are connected together by a load bearing member which has a plurality of voids therein adjoining the outer perimeter of the piston pin ring portion.

The invention, in one form thereof, still further provides a connecting rod having a piston pin ring portion with a bore therein and a crankshaft ring portion having a bore therein. The two ring portions are connected together with three ribs and two web portions which extend between and interconnect the three ribs. A plurality of voids are provided within the web portions and between the ribs adjoining the outer perimeters of both ring portions.

BRIEF DESCRIPTION OF THE DRAWINGS

The above-mentioned and other features and objects of this invention and the manner of obtaining them will become more apparent, and the invention itself will be better understood by reference to the following description of an embodiment of the invention, taken in conjunction with the accompanying drawings, wherein:

FIG. 1 is a perspective view showing a connecting rod assembled to a piston and a crankshaft;

FIG. 2 is a perspective view of a connecting rod according to the present invention assembled with a press-fitted liner and a drawn cup bearing;

FIG. 3 is a front elevational view of the connecting rod of FIG. 2 showing the webbing, voids, ribs, ring portions, a liner with roller bearings and a drawn cup bearing;

FIG. 4 is a side elevational view of the connecting rod of FIG. 2 showing, with hidden lines, the webbing, liner and the drawn cup bearing;

FIG. 5 is a cross-sectional view taken along line 5—5 of FIG. 3 showing the webbing and ribs;

FIG. 6 is a cross-sectional view taken along line 6—6 of FIG. 3 showing the ribs and voids adjacent to the crankshaft ring portion;

FIG. 7 is a cross-sectional view of the connecting rod along line 7—7 of FIG. 3 showing the liner and drawn cup bearing along with the inner periphery of the crankshaft and piston pin ring bores;

FIG. 8 is an exploded perspective view of the connecting rod of FIG. 2 together with a liner and a cup bearing;

Corresponding reference characters indicate corresponding parts throughout the several views of the drawings.

Figure 9:
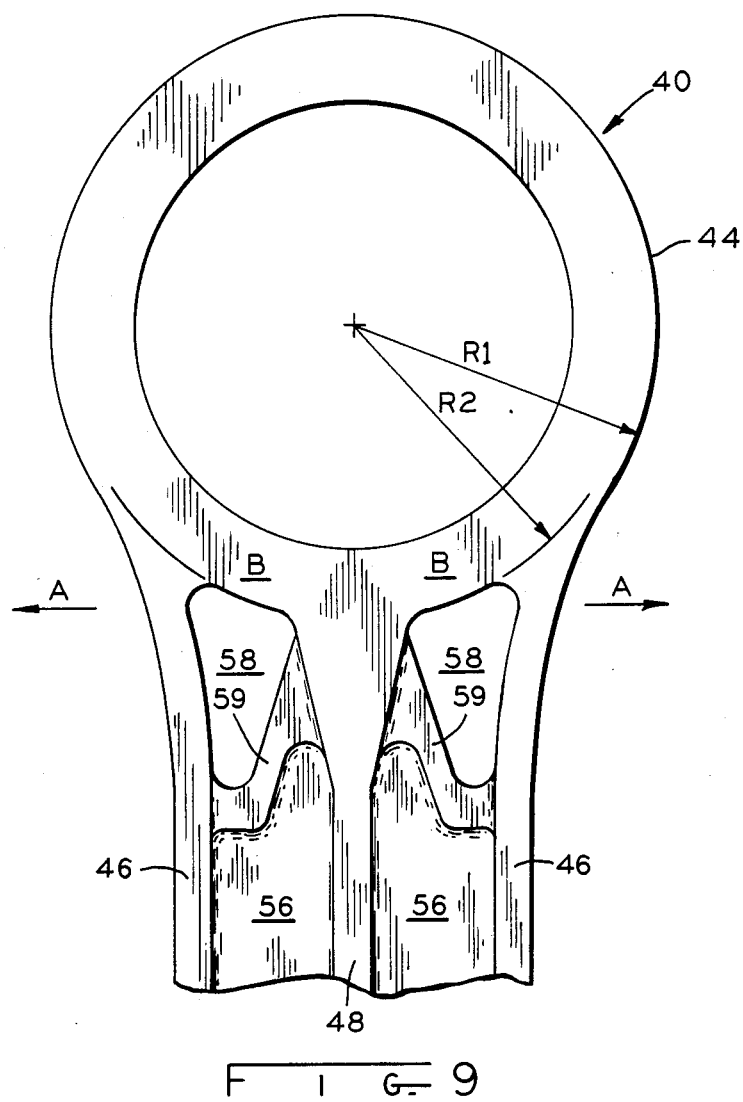
FIG. 9 is an enlarged front elevational view of a ring portion according to the present invention showing the ring portion adjoining the voids and ribs.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENTS

As shown in FIG. 1 of the drawings, the connecting rod of the present invention is used for connecting together reciprocating and rotating members in combustion engines and compressors.

More specifically, referring to FIG. 1, connecting rod 10 is shown connected to piston 12 and crankshaft 14. A drawn cup bearing 18 is used in the connection between connecting rod 10 and piston 12. Drawn cup bearing 18 rotatably receives a piston pin 17 (shown in FIG. 4) which is mounted within yoke type thrust washer 19 and piston shoulders 20. This structure is further described in U.S. Pat. No. 4,549,445 assigned to the assignee of record of the present invention and which is incorporated herein by reference. Liner 16 is used in the connection between connecting rod 10 and crankshaft 14. Liner 16 receives within it and rotates about crankshaft cylindrical portion 22. As shown in FIGS. 3 and 7, roller bearings 23 may be used between liner 16 and cylindrical portion 22 for further decreasing rotational friction. The manner of assembling connecting rod 10 to crankshaft 14 with roller bearings 23 is further described in U.S. Pat. No. 4,494,286 which is assigned to the assignee of record of the present invention and which is incorporated herein by reference.

Now referring to FIGS. 2-4 and 7 and 8, drawn cup bearing 18 has within it a plurality of roller bearings 26. Drawn cup bearing 18 has an outer cylindrical surface 28 which, at any given temperature, has a diameter slightly greater than the diameter of the piston pin bore 24 of connecting rod 10 at the same given temperature. Drawn cup bearing 18 is adapted to be press-fitted into piston pin bore 24, as shown in FIG. 8 such that the cup bearing outer cylindrical surface pushes radially outwardly and fits tightly within said piston pin bore 24. Drawn cup bearing 28 receives within it piston pin 17 and rotates therearound.

Cylindrically shaped liner 16 has at one end thereof a liner lip 30. Liner 16 also has outer cylindrical surface 32, and a liner inner surface 36. As shown in FIG. 8, a liner 16 is adapted to be press-fitted into crankshaft ring bore 34 of connecting rod 10. The radial diameter of the liner outer surface 32 at any given temperature is slightly greater than the crankshaft ring bore 34 diameter at the same given temperature such that, when liner 16 is press-fitted into crankshaft ring bore 34, liner 16 pushes radially outward and is held tightly within the crankshaft ring bore 34. Roller bearings 23 can be used between liner inner surface 36 and crankshaft portion 22 as discussed above. Thus, cylindrical liner 16 receives and rotates about crankshaft cylindrical portion 22.

Piston pin ring bore 24 is formed and located within a piston pin ring portion generally indicated as 38. Crankshaft ring bore 34 is formed and located within a crankshaft ring portion generally indicated as 40. Piston pin ring portion 38 has an outer peripheral surface 42 and crankshaft ring portion 40 has an outer peripheral surface 44. Piston pin ring portion outer peripheral surface 42, and crankshaft ring portion outer peripheral surface 44 are connected together by two outer ribs 46 and center rib 48. Center rib 48 is connected to outer peripheral surfaces 42 and 44 generally perpendicularly. In this fashion, center rib 48 is the major load carrying member, while the two outer ribs 46 provide stiffness for countering bending, twisting and carry a portion of the load. As shown in the drawings, outer ribs 46 and center rib 48 are generally parallel to one another. Further, ribs 46 and 48 are generally coplanar with piston pin ring portion 38 and crankshaft ring portion 40.

Figure 10:
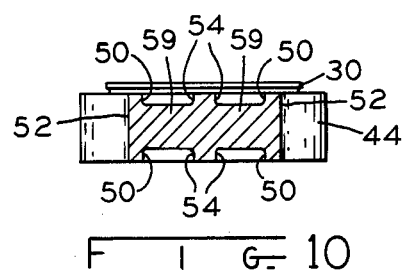
FIG. 10 is cross-sectional view taken along lines 10—10 of FIG. 3 showing the thicker web portions.

Referring now, more specifically, to FIGS. 5, 6 and 10 outer ribs 46 have an inner surface 50 and an outer surface 52. Center rib 48 has web connecting surfaces 54 on its two opposite sides. Webbing 56 extends between and connects together outer ribs 46 to center rib 48. More specifically, webbing 56 is connected to the outer ribs' inner surface 50 and the respective center rib web connecting surface 54. Webbing 56 is generally perpendicular to ribs 46 and 48 and also coplanar therewith.

At the ends of webs 56, between ribs 48 and 46 and adjoining the outer perimeter of ring portions 38 and 40, there are voids 58. At the end of webs 56 adjoining voids 58, thicker webbing portions 59 extend between ribs 48 and 46. Webbing portions 59 in essence are ribs which, by interconnecting outer ribs 46 to center ribs 48, provide additional rigidity for countering bending and twisting.

Referring to FIG. 9, ring portion 40 is shown enlarged. R1 is the radius of the outer perimeter of ring portion 40. R2, which is smaller than R1, represents the radius of the outer perimeter of ring portion 40 only at parts "B" of ring portion 40. Accordingly, parts "B" of ring portion 40 are thinner than the rest of ring portion 40. More specifically, parts "B" are adjacent to voids 58 and are thinner than the rest of ring portion 40. Parts "B" are thinner than the rest of ring portion 40 by the amount of R1 minus R2. In similar fashion, parts "B" of ring portion 38, as shown in FIG. 3, are also thinner than the rest of ring portion 38.

Connecting rod 10 is made of a lightweight metal such as aluminum while the liner 16 and drawn cup bearing 18 are made of a material such as hardened or heat treated steel. Connecting rod 10 is generally cast or molded having ring portions 38 and 40 already connected with ribs 46 and 48 and with ribs 46 connected together by webbing 56. Voids 58 are also formed during the casting or molding of rod 10. Piston pin ring bore 24 and crankshaft ring bore 34 are machined thereafter so as to make substantially smooth circular bores. As shown in FIG. 3, webbing 56 does not extend and is not connected to outer peripheral surfaces 42 and 44 and thus voids 58 are created. Because of voids 58, the outer peripheral surfaces 42 and 44 are connected together at three distinct points, namely, at the ends of outer ribs 46 and center rib 48.

When press-fitting liner 16 and drawn cup bearing 18, within their respective bores, radially outward forces are placed on the piston pin ring portion 38 and crankshaft ring portion 40. These radial forces cause ring portions 38 and 40 to deform in the direction of least resistance. Accordingly, the present connecting rod design, by utilizing voids 58 adjacent to peripheral surfaces 42 and 44 and by providing a thinner portion "B" adjacent voids 58, equalizes the cantilever resistive forces around ring portions 38 and 40 such that deformation of ring portions 38 and 40 are radially equivalent. In essence, parts "B" of ring portions 38 and 40, due to voids 58 and because parts "B" are thinner than the rest of ring portions 38 and 40, are allowed to deform and expand in the same fashion as the rest of the ring portions 38 and 40. As parts "B" deform and elongate accordingly, outer ribs 46, at the connection at the outer peripheral surfaces 44 and 42, deform in the direction generally indicated by arrows "A". Further, outer ribs 46, by deforming in the direction indicated by "A", provide a cantilever resistive force against direction "A". However, the cantilever resistive force offsets the radial outward forces created through the press fitting operation and the resulting shape of ring portions 40 and 42 are substantially circular. That is, the radial deformation of piston pin ring bore 24 and crankshaft ring bore 34 is equal. Consequently, and more importantly, the resulting bores 24 and 34, after press-fitting the respective bearing 18 and liner 16, remain substantially circular.

By retaining substantially circular bores 24 and 34, liner 16 and drawn cup bearing 18 also retain a substantially circular structure. It is therefore possible to provide a tighter clearance between the respective liner 16 or cup bearing 18 and crankshaft cylindrical portion 22 or piston pin 17. Further, by providing a more uniform circular fit, the forces transferred between connecting piston 12, rod 10, and crankshaft 14 are transferred more uniformly through bearing 18 and liner 16 and hence the life of the respective contacting members are substantially increased. In essence, the forces are more uniformly transferred over a larger surface area between piston 12 connecting rod 10 and crankshaft 14 through the respective larger contacting surfaces. Because the forces are distributed over larger surface areas, deformation of each member is also decreased during dynamic conditions. Since each member, through a more uniform circular fit, deforms less during dynamic conditions, the life of each respective member is also increased. Further yet, because the forces are more evenly distributed over larger surface areas, uneven physical wear due to friction is substantially decreased. Thus, the connecting rod design disclosed herein substantially increases the life of liner 16, drawn cup bearing 18, connecting rod 10, piston pin 17 and crankshaft 14.

While the invention has been described as having a specific embodiment, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A connecting rod for use in an internal combustion engine comprising:
    a unitary piston pin ring portion having a piston pin bore therein and including an outer peripheral surface;
    a unitary crankshaft ring portion having a crankshaft bore therein and including an outer peripheral surface;
    a load bearing member connecting said piston pin ring and crankshaft ring portions, said bearing member and ring portions being substantially coplanar, said bearing member including at least three ribs, each said ribs interconnecting the outer peripheral surfaces of said respective ring portions; and
    a plurality of voids in said load bearing member between said respective ribs, said voids adjoining said outer peripheral surface of said crankshaft ring portion.

2. The connecting rod of claim 1 including a further plurality of voids in said load bearing member between said respective ribs, said further plurality of voids adjoining said outer peripheral surface of said piston pin ring portion.

3. The connecting rod of claim 1 including a plurality of webs extending between and connecting together said ribs, said webs being thinner than said ribs.

4. The connecting rod of claim 1 including a cylindrical member disposed within said crankshaft bore.

5. The connecting rod of claim 1 including two cylindrical members respectively disposed in said crankshaft bore and said piston pin bore.

6. The connecting rod of claim 3 wherein the portions of said webs adjoining said voids are of greater thickness than the remaining portions of said webs.

7. The connecting rod of claim 3 wherein said ring portions each include a region of reduced cross section, each said region adjoining one of said voids.

8. A connecting rod for use in an internal combustion engine comprising:
    a unitary piston pin ring portion having a piston pin bore therein and including an outer peripheral surface;
    a unitary crankshaft ring portion having a crankshaft bore therein and including an outer peripheral surface;
    a load bearing member connecting said piston pin ring portion and crankshaft ring portion, said load bearing member and respective ring portions being substantially coplanar and said load bearing member having at least three ribs, each said ribs interconnecting the outer peripheral surfaces of said respective ring portions; and a plurality of voids in said load bearing member between said respective ribs, said voids adjoining said outer peripheral surface of said piston pin ring portion.

9. The connecting rod of claim 8 including a further plurality of voids in said load bearing member between said respective ribs, said further plurality of voids adjoining said outer peripheral surface of said crankshaft ring portion.

10. The connecting rod of claim 8 including a plurality of webs extending between and connecting together said ribs, said webs being thinner than said ribs.

11. The connecting rod of claim 8 including a cylindrical member disposed within said piston pin bore.

12. The connecting rod of claim 8 including two cylindrical members respectively disposed in said crankshaft bore and said piston pin bore.

13. The connecting rod of claim 10 wherein the portions of said webs adjoining said voids are of greater thickness than the remaining portions of said webs.

14. The connecting rod of claim 9 wherein said ring portions have a region of reduced cross-section, each said region adjoining one of said voids.

15. A connecting rod for interconnecting reciprocating and rotating members in an internal combustion engine, said connecting rod comprising:

a unitary piston pin ring portion having a bore therein and including an outer peripheral surface;

a unitary crankshaft ring portion having a bore therein and including an outer peripheral surface;

a connecting member for interconnecting said ring portions and including three ribs which are coplanar with said ring portions and are substantially parallel to each other, one end of each said ribs being directly connected to the outer peripheral surface of said piston pin ring portion and the other end of each said ribs being directly connected to the outer peripheral surface of said crankshaft ring portion, the first of said three ribs being located between the other two ribs and being arranged substantially perpendicularly to the outer peripheral surfaces of said respective ring portions;

two webs extending between and respectively interconnecting said ribs; and a plurality of voids located between said ribs, between said webs and the outer peripheral surfaces of said ring portions.

16. The connecting rod of claim 15 further comprising two cylindrical members, said cylindrical members being retained in said respective bores by mechanical interference.

17. The connecting rod of claim 16 wherein said connecting rod is made of aluminum and wherein said cylindrical members are made of steel.

18. The connecting rod of claim 15 wherein said voids are substantially triangularly shaped with one side of each said voids located substantially along the respective outer peripheral surfaces of said ring portions.

19. The connecting rod of claim 15 wherein the ends of said webs which adjoin said voids are thicker than the portions of said webs between said web ends.

20. The connecting rod of claim 15 wherein the portions of at least one of said rings which adjoin said voids have a smaller cross-sectional area than the remaining portions of said at least one ring.

* * * * *